US011240379B2

(12) United States Patent
Hunter et al.

(10) Patent No.: US 11,240,379 B2
(45) Date of Patent: Feb. 1, 2022

(54) FUNCTION PRIORITIZATION IN A MULTI-CHANNEL, VOICE-DATALINK RADIO

(71) Applicant: Honeywell International Inc., Morris Plains, NJ (US)

(72) Inventors: Jeffrey Kent Hunter, Olathe, KS (US); Steve Neuharth, Coeur d'Alene, ID (US); Naveen VenkateshPrasad Nama, Phoenix, AZ (US); Jyotsna Motukupally, Olathe, KS (US)

(73) Assignee: Honeywell International Inc., Charlotte, NC (US)

( * ) Notice: Subject to any disclaimer, the term of this patent is extended or adjusted under 35 U.S.C. 154(b) by 631 days.

(21) Appl. No.: 15/201,949

(22) Filed: Jul. 5, 2016

(65) Prior Publication Data

US 2017/0302798 A1    Oct. 19, 2017

Related U.S. Application Data

(60) Provisional application No. 62/324,215, filed on Apr. 18, 2016.

(51) Int. Cl.
*H04M 3/533* (2006.01)
*H04W 28/14* (2009.01)
(Continued)

(52) U.S. Cl.
CPC .......... *H04M 3/533* (2013.01); *H04L 69/323* (2013.01); *H04W 4/10* (2013.01); *H04W 28/14* (2013.01);
(Continued)

(58) Field of Classification Search
CPC ....... H04M 3/533; H04L 69/323; H04W 4/10; H04W 28/14
See application file for complete search history.

(56) References Cited

U.S. PATENT DOCUMENTS 5,448,768 A * 9/1995 Zinser .................... G01S 7/003
455/108
5,459,469 A * 10/1995 Schuchman .......... G01S 13/765
342/37
(Continued)

FOREIGN PATENT DOCUMENTS

CN          1836455 A      9/2006
CN        101268705 A      9/2008
(Continued)

OTHER PUBLICATIONS

"Draft 2 of Supplement 7 to Arinc Specification 618 Air-Ground Character-Oriented Protocol", Nov. 24, 2009, pp. 1-282.
(Continued)

*Primary Examiner* — Jael M Ulysse
(74) *Attorney, Agent, or Firm* — Fogg & Powers LLC

(57) ABSTRACT

A method of function prioritization in a multi-channel voice-datalink radio is provided. The method comprises suspending transmission of one or more data messages on a communication channel when transmission of a voice message is active on the communication channel, buffering the one or more data messages while the transmission of the voice message is active, and resuming transmission of the buffered one or more data messages on the communication channel when the transmission of the voice message ends.

18 Claims, 3 Drawing Sheets

(51) Int. Cl.
   *H04L 29/08* (2006.01)
   *H04W 4/10* (2009.01)
   *H04W 74/08* (2009.01)
   *H04W 76/20* (2018.01)
   *H04W 76/45* (2018.01)

(52) U.S. Cl.
   CPC ....... *H04W 74/08* (2013.01); *H04W 74/0808* (2013.01); *H04W 76/20* (2018.02); *H04W 76/45* (2018.02)

(56) References Cited

U.S. PATENT DOCUMENTS

| | | | | |
|---|---|---|---|---|
| 5,798,726 A | * | 8/1998 | Schuchman | G08G 5/0013 342/32 |
| 8,019,338 B2 | | 9/2011 | Malaga et al. | |
| 8,294,596 B2 | | 10/2012 | Lavielle et al. | |
| 9,094,087 B2 | | 7/2015 | Malaga | |
| 2002/0004393 A1 | * | 1/2002 | Heppe | H04B 7/18508 455/431 |
| 2002/0068593 A1 | * | 6/2002 | Deltour | H04B 7/2656 455/502 |
| 2003/0055975 A1 | * | 3/2003 | Nelson | H04B 7/18506 709/227 |
| 2003/0227912 A1 | | 12/2003 | Kachi | |
| 2004/0125800 A1 | * | 7/2004 | Zellner | H04W 72/10 370/389 |
| 2006/0046715 A1 | * | 3/2006 | Burgemeister | G08G 5/0013 455/431 |
| 2007/0088467 A1 | * | 4/2007 | Knotts | G01C 23/005 701/14 |
| 2008/0176557 A1 | * | 7/2008 | Hellstrom | H04W 76/20 455/425 |
| 2008/0181250 A1 | * | 7/2008 | Koski | H04W 74/0808 370/445 |
| 2008/0192721 A1 | * | 8/2008 | Pernu | H04W 72/1215 370/345 |
| 2008/0254750 A1 | * | 10/2008 | Filho | H04B 7/18506 455/73 |
| 2009/0017853 A1 | * | 1/2009 | Ozog | H04M 11/022 455/509 |
| 2009/0298451 A1 | * | 12/2009 | Malaga | H04B 1/40 455/129 |
| 2009/0323608 A1 | * | 12/2009 | Adachi | H04W 28/20 370/329 |
| 2010/0080236 A1 | * | 4/2010 | Shawbaki | H04W 84/10 370/400 |
| 2010/0135202 A1 | * | 6/2010 | Chun | H04L 1/1877 370/328 |
| 2012/0083264 A1 | * | 4/2012 | Ramasamy | H04W 52/262 455/425 |
| 2012/0184228 A1 | * | 7/2012 | Mujtaba | H04B 1/04 455/103 |
| 2012/0303826 A1 | * | 11/2012 | Nelson | H04W 84/02 709/228 |
| 2013/0012170 A1 | | 1/2013 | Othmer et al. | |
| 2014/0146683 A1 | * | 5/2014 | Stogner | H04L 29/06 370/241 |
| 2014/0220918 A1 | * | 8/2014 | Sherwood | H03J 1/0083 455/161.1 |
| 2014/0256326 A1 | * | 9/2014 | Morgan | H04W 36/0016 455/437 |
| 2015/0180567 A1 | * | 6/2015 | Apostolakos | H04W 4/10 370/316 |
| 2016/0164646 A1 | * | 6/2016 | Kwon | H04W 24/08 370/252 |
| 2017/0223597 A1 | * | 8/2017 | Telang | H04W 36/24 |

FOREIGN PATENT DOCUMENTS

| | | |
|---|---|---|
| CN | 103686804 A | 3/2014 |
| CN | 103796340 A | 5/2014 |
| CN | 105075384 A | 11/2015 |
| EP | 1932760 | 6/2008 |
| EP | 2876815 | 5/2015 |
| GN | 1617605 A | 5/2005 |
| GN | 102130702 A | 7/2011 |

OTHER PUBLICATIONS

"VHF Data Radio Arinc Characteristic 750-4", Aug. 11, 2004, pp. 1-178.

"Minimum Operational Performance Standards (MOPS) for Aircraft VDL Mode 2 Physical Link and Network Layer", Mar. 21, 2012, pp. 1-302.

European Patent Office, "European Search Report from EP Application No. 17162928.0 dated Sep. 18, 2017", from Foreign Counterpart of U.S. Appl. No. 15/201,949, filed Sep. 18, 2017, pp. 1-7, Published in: EP.

National Intellectual Property Administration, P. R. China, "First Office Action from CN Application No. 201710248630.4", from Foreign Counterpart to U.S. Appl. No. 15/201,949, filed Dec. 24, 2020, pp. 1 through 28, Published: CN.

3GPP, "Report of 3GPP TSG RAN WG2 meeting #87bis", 3GPP TSG-RAN Working Group 2 meeting #88, R2-144750, Nov. 2014, pp. 1 through 124, 3GPP.

Dongping, "A Study of Communications Technology between Digital Radio Test Equipment and Radio", A Thesis submitted to Xidian University in partial fulfillment of the requirements for the degree of Master in Instrument and Meter Engineering, Apr. 2014, pp. 1 through 102.

National Intellectual Property Administration, P.R. China, "Second Office Action from CN Application No. 201710248630.4", from Foreign Counterpart to U.S. Appl. No. 15/201,949, filed Aug. 11, 2021, pp. 1 through 14, Published: CN.

* cited by examiner

FUNCTION PRIORITIZATION IN A MULTI-CHANNEL, VOICE-DATALINK RADIO

This application claims the benefit of priority to U.S. Provisional Application No. 62/324,215, filed on Apr. 18, 2016, the disclosure of which is incorporated by reference.

BACKGROUND

As new technologies are developed, such technologies may be disruptive to established protocols in a communication system. For example, broadband sampling radio receivers have capabilities not envisioned at the time communication standards were established. An example of this is the aerospace digital communications standard described in RTCA document DO-281. When written, this industry standard assumed that a radio transceiver would be dedicated to a single function, in this case digital data transmission on a single channel.

Technology currently exists that allows for a radio to furnish multiple functions operating on multiple channels, and thus is not limited to a single data only function. The radio in this case functions as the communications physical link layer. Normally in the physical link layer function, the radio acts as a "dumb" modem. Accordingly, there is a need for a radio with multi-function and multi-channel capability to be integrated into a communication system network without disturbing the link layer definitions defined by industry standards.

SUMMARY

A method of function prioritization in a multi-channel voice-datalink radio is provided. The method comprises suspending transmission of one or more data messages on a communication channel when transmission of a voice message is active on the communication channel, buffering the one or more data messages while the transmission of the voice message is active, and resuming transmission of the buffered one or more data messages on the communication channel when the transmission of the voice message ends.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1:
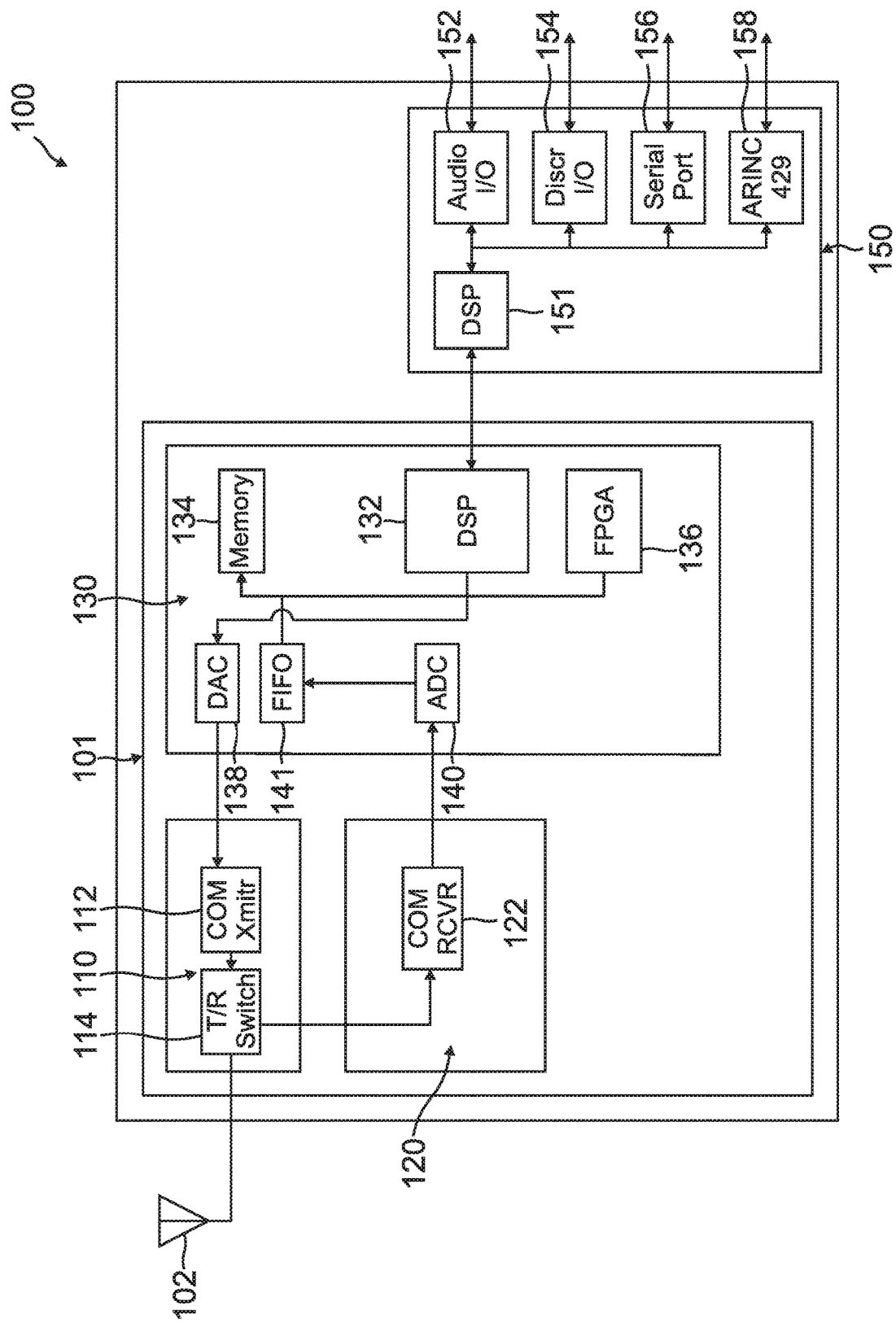
FIG. 1 is a block diagram of a multi-channel, voice-datalink radio system, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system and method for function prioritization in a multi-channel, voice-datalink radio is provided. The present approach allows for integrating multi-function, multi-channel capabilities into a communication system without disturbing the standard link layer functionalities or definitions. A significant reduction in cost and complexity is gained since the multi-function, multi-channel capability remains fully in the radio physical layer. The present approach also has the advantage in that since other link layers are unaffected, there is no need to modify industry standards to accommodate the use of multi-function, multi-channel capabilities.

In one embodiment, a multi-mode data radio (MMDR) is provided, which includes multi-function, multi-channel capabilities. The multi-mode data radio can simultaneously receive and process radio frequency (RF) signals on up to two voice channels and one data channel, while transmitting on one frequency at any given time. When a voice transmission is commanded (e.g., via a push-to-talk (PTT) switch) on the main communication channel, any data transmission in progress is immediately preempted by the voice transmission. While the voice transmission is active, all downlink messages by the radio are halted and buffered. In addition, while the voice transmission is active, no uplink transmissions can be received.

When the voice transmission ends, the buffered downlink messages are then attempted to be transmitted on the channel if it is not busy. The downlink transmission resumes from the beginning of the last block that was not transmitted in its entirety. In one embodiment, the MMDR has a 30 second "stuck mic" time-out. If the voice transmission is active for more than 30 seconds, the voice transmission will stop and the buffered downlink messages will then be attempted to be transmitted. The downlink transmission resumes from the beginning of the last block that was not transmitted in its entirety.

In one embodiment, the multi-mode data radio combines an avionics audio communication function on one channel frequency, and an avionics data link function such as the VHF Data Link (VDL) Mode 2 function on a separate channel frequency. The VDL Mode 2 is a carrier sense multiple access (CSMA) communication system. Both the audio communication function and the data link function can receive ground transmissions simultaneously without conflict. However, when either function transmits to the ground, the other function loses ability to receive or transmit. This limitation forces functions to be prioritized within the physical layer.

The multi-mode data radio sets the audio transmit function as the highest priority, and therefore the VDL Mode 2 transmit function is delayed until after the audio transmission ends. According to the aerospace digital communications standard RTCA document DO-281B, the disclosure of which is incorporated by reference, there is no messaging to other link layers that this conflict is occurring or that the VDL Mode 2 transmission is being delayed. The present method bypasses the limitation of the standard in RTCA document DO-281B through the use of the CSMA function residing in the physical layer. During audio transmission, the physical layer artificially reports up the communication link layers that the channel is occupied and that VDL data transmission is delaying. After the audio transmission ends, the physical layer returns the CSMA function to normal and is able to send the message and report up the link layers that transmission was successful. The physical layer will queue up VDL transmission messages and when audio transmission is complete, resume the channel access algorithm in order to empty the VDL message queue.

In another embodiment, the multi-mode data radio combines an avionics audio communication function on one channel frequency, and an avionics data link function using the VDL Mode A protocol on a separate channel frequency. The VDL Mode A protocol is a CSMA communication method that uses non-persistent CSMA and is defined in ARINC document 618, the disclosure of which is incorporated by reference.

Further details of the present system and method are described hereafter with reference to the drawings.

FIG. 1 is a block diagram of a multi-channel, voice-datalink radio system 100 according to one embodiment. The radio system 100 generally includes a multi-mode radio module 101 that comprises a transmitter section 110, a receiver section 120, and a processor section 130, which is operatively coupled to the transmitter section 110 and the receiver section 120.

The transmitter section 110 includes a communications transmitter 112 configured to send an RF signal in a communications band to a first antenna 102 through a transmitter/receiver (T/R) switch 114. The receiver section 120 includes a communications receiver 122 configured to receive an RF signal in the communications band from first antenna 102 through T/R switch 114.

The processor section 130 includes a first digital signal processor (DSP) 132, a memory unit 134, and a field programmable gate array (FPGA) 136, which are all operatively coupled to each other. The communications transmitter 112 is operatively coupled to processor section 130 through a digital to analog converter (DAC) 138, which also acts as a codec. The communications receiver 122 is operatively coupled to processor section 130 through an analog to digital converter (ADC) 140, which outputs a digital signal to a data buffer 141, such as a first in, first out (FIFO) buffer. The data buffer 141 is operatively coupled to DSP 132, memory unit 134, and FPGA 136.

The processor section 130 is operatively coupled to a digital interface unit 150, which includes a second DSP 151 that communicates with first DSP 132. The second DSP 151 is operatively coupled to audio input/output (I/O) circuitry 152, discrete I/O circuitry 154, a serial port 156, and an ARINC 429 interface 158. The digital interface unit is configured to communicate with a standard communications management unit (CMU) in an aircraft.

Figure 2:
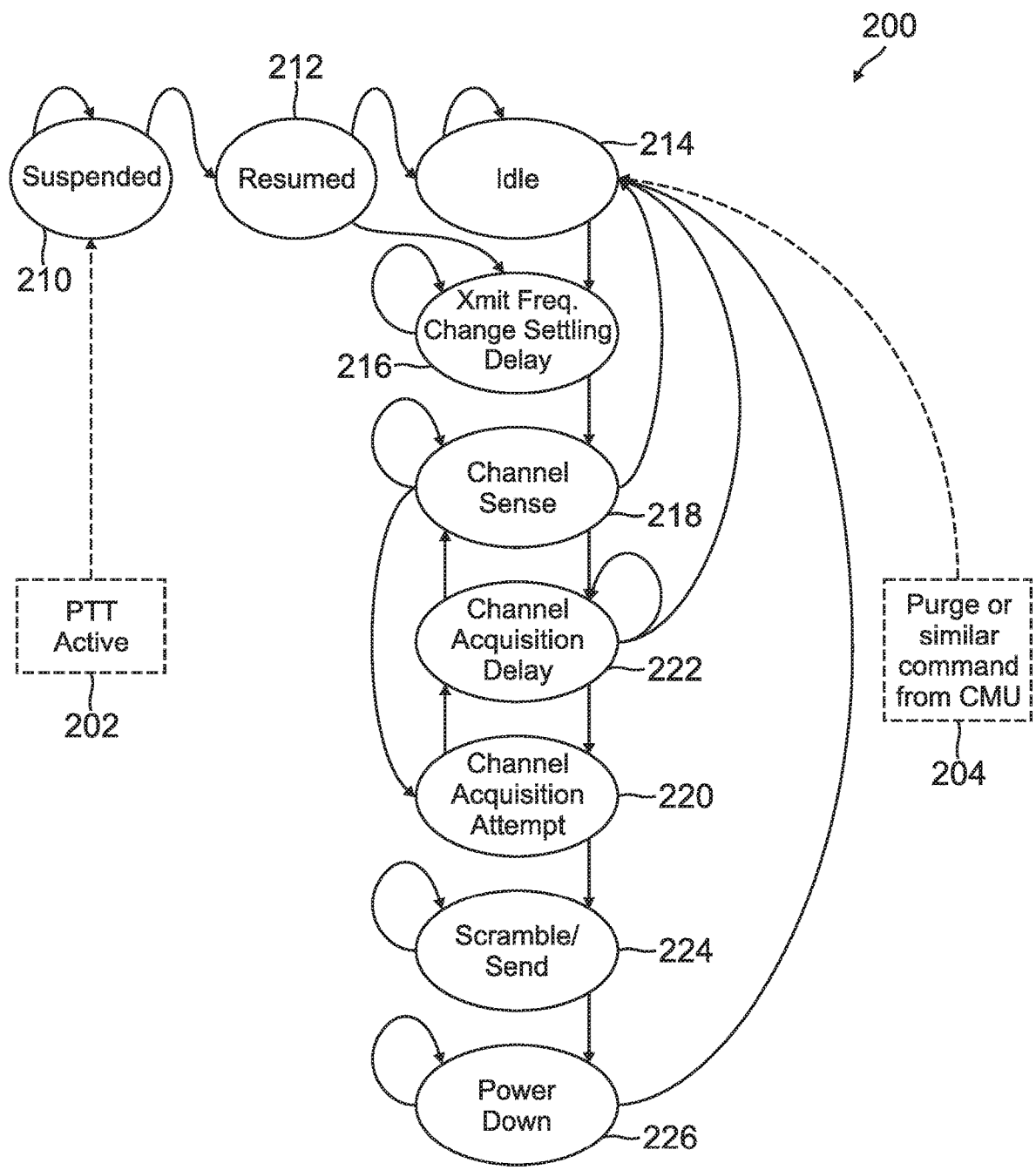
FIG. 2 is a flow diagram for a state machine operation according to one mode carried out by the multi-channel, voice-datalink radio system of FIG. 1.

FIG. 2 is a flow diagram 200 for an output state machine that can be implemented by the multi-channel, voice-datalink radio system of FIG. 1, according to the VDL Mode 2 protocol. As voice transmissions have priority over data transmissions in this radio system, a suspended state 210 is entered whenever a push-to-talk (PTT) is active (block 202), and the current state is abandoned immediately, after being recorded for reference later.

A resumed state 212 is entered when the PTT transitions from active to inactive. If an encoded message buffer is empty, or if the output state machine state is idle when the suspended state 210 is entered, then the resumed state 212 transitions to an idle state 214. It should be noted that these conditions are treated separately since the output state machine may have been in a state other than idle when PTT became active, but during that time a command from the CMU may have caused the encoded message buffer to be purged (block 204). If neither of the preceding conditions is true, then a transmission was in progress when the state transitioned to the suspended state 210 (and needs to be restarted without reinitializing certain parameters), and the resumed state 212 transitions to a transmit frequency change settling delay state 216. Once in the idle state 214, the output state machine remains there if the encoded message output buffer is empty. When a message becomes available, various parameters used by other states are initialized and the idle state 214 transitions to the transmit frequency change settling delay state 216.

In one embodiment, the transmitter of the radio system is "parked" on the VDL Mode 2 frequency. Since voice transmissions have priority over data transmissions, a voice transmission will cause a synthesizer in the radio system to change frequencies. When the voice transmission completes, the synthesizer will be returned to the VDL Mode 2 frequency, at which time a tick count will be recorded. Once the transmit frequency change settling delay state 216 has been entered, the output state machine remains there until a prescribed time has passed since the most recent retune tick count was recorded. When the output state machine exits this state, it enters a channel sense state 218.

The channel sense state 218 is one of three states that collectively implement the CSMA p-persistent protocol, with the other two being a channel acquisition attempt state 220, and a channel acquisition delay state 222. Each time the channel sense state 218 executes, it tests whether a "channel congested" timer (specified by the CMU as "TM2") has elapsed. If this timer has elapsed, which indicates the channel could not be acquired within time TM2, the channel sense state 218 purges all messages in a raw input buffer and the encoded message buffer, notifies the CMU, and transitions back to the idle state 214. Otherwise, the channel sense state 218 determines whether the received signal strength exceeds a predefined threshold in the manner detailed in the VDL Mode 2 system requirements specification. If the channel is not occupied, the channel sense state 218 transitions to the channel acquisition attempt state 220.

In the channel acquisition attempt state 220, a random number is generated and compared against a CSMA "persistence" parameter specified by the CMU. If the persistence parameter is greater than this random number, then the channel is "acquired" and the channel acquisition attempt state 220 transitions to a scramble/send state 224. The channel acquisition attempt state 220 will also transition to the scramble/send state 224 if an attempt to acquire the channel has failed more than "M1" times, where M1 is a value specified by the CMU. Otherwise, the channel acquisition attempt state 220 transitions to the channel acquisition delay state 222.

Once entered, the channel acquisition delay state 222 will be exited under one of three conditions. Each time the channel acquisition delay state 222 executes, it will, in order: (1) check the channel congested timer (TM2) and if it has expired, all messages in the raw input buffer and the encoded message buffer will be purged, the CMU will be notified, and the channel acquisition delay state 222 will transition back to the idle state 214; (2) check whether the channel has become occupied, and if it has, the channel acquisition delay state 222 will transition to the channel sense state 218; and (3) check the "time to next access attempt" timer (specified by the CMU as "TM1") and if it has expired, will transition to the channel acquisition attempt state 220.

The scramble/send state 224 is entered when the channel has been acquired, and once there, the VDL Mode 2 transmitter proceeds to send the downlink message. The scramble/send state 224 transitions to a power down state 226 once all the symbols for a message have been output.

Once entered, the power down state 226 is exited only when the FPGA indicates that it has transmitted the final symbol of a message. At that point, the FPGA notifies the CMU that the message has been transmitted. The power down state 226 then transitions back to the idle state 214.

Figure 3:
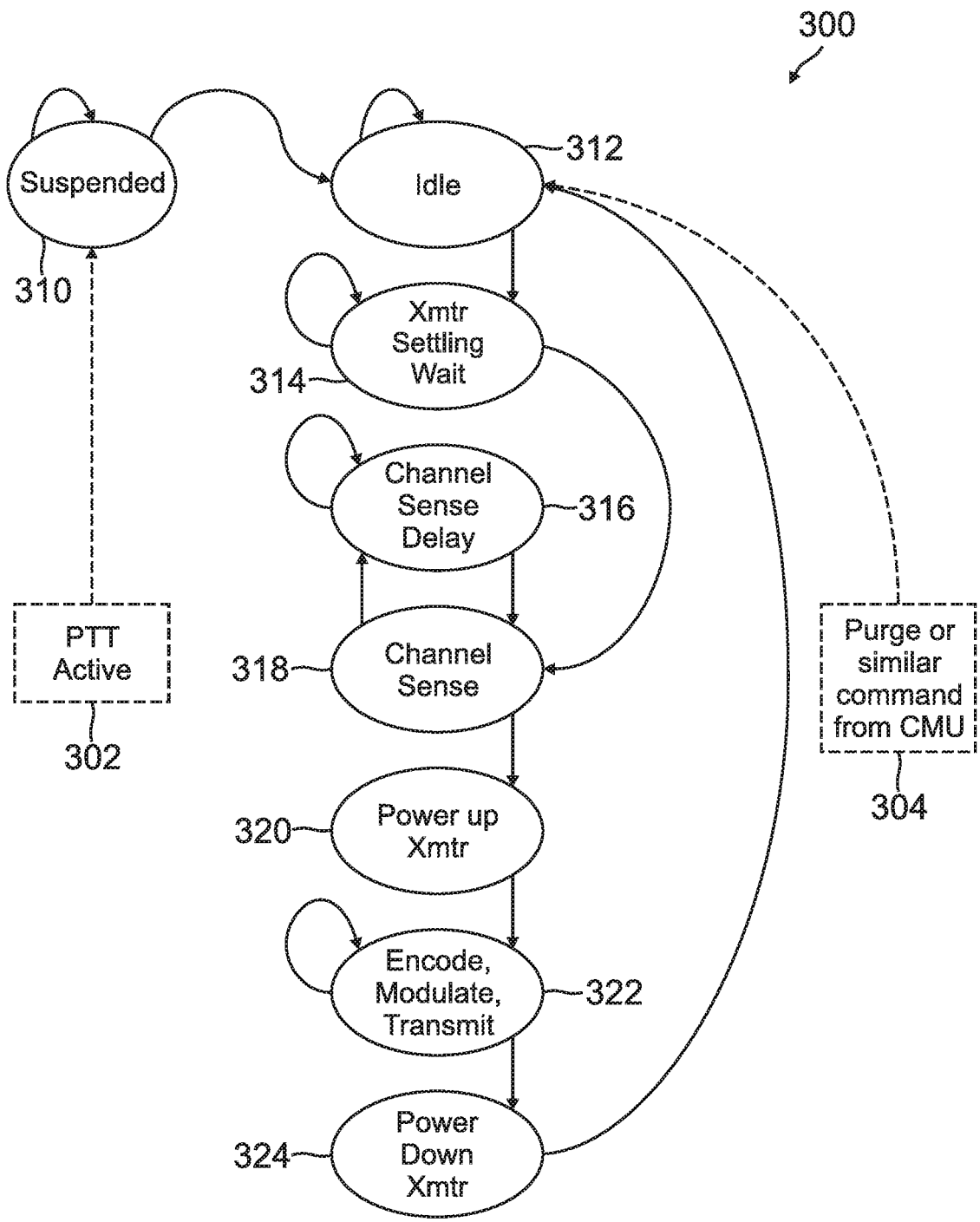
FIG. 3 is a flow diagram for a state machine operation according to another mode carried out by the multi-channel, voice-datalink radio system of FIG. 1.

FIG. 3 is a flow diagram 300 for an output state machine that can be implemented by the multi-channel, voice-datalink radio system of FIG. 1, according to the VDL Mode A protocol. As voice transmissions have priority over data transmissions, a suspended state 310 is entered whenever a PTT is active (block 302), and the current state is abandoned immediately. When PTT is deactivated suspended state 310 is exited, and the state machine enters an idle state 312.

Once in idle state 312, the state machine remains there as long as the input message buffer is empty. The idle state 312 can also be entered from a purge or similar command from the CMU (block 304), which forces all queued messages to be flushed. In addition, idle state 312 can be entered from a power down transmitter state 324 (because a message has been completely transmitted). When a message becomes available, the state machine transitions to a transmitter settling wait state 314.

In the transmitter settling wait state 314, the transmitter will be "parked" on the VDL Mode A frequency. Since voice transmissions have priority over data transmissions, a voice transmission will cause the synthesizer in the transmitter to change frequencies. When the voice transmission completes, the synthesizer will be retuned to the VDL Mode A frequency. In the transmitter settling wait state 314, a register in the FPGA is read until it indicates that the synthesizer has locked, at which time the state machine will transition to a channel sense state 318. The channel sense state 318 is typically a pass through state because the synthesizer will normally be on the VDL Mode A frequency, so no settling time will be required.

Together, the channel sense state 318 and a channel sense delay state 316 implement the non-persistent CSMA protocol. In the channel sense state 318, the idle/busy status of the channel into space is checked. If the channel is idle, the state machine initializes objects used to encode and modulate the data, then transitions to a power up transmitter state 320. If the channel is busy, a random wait time is generated and the state machine transitions to the channel sense delay state 316.

Once the state machine enters the channel sense delay state 316, it remains there, counting down during each interrupt cycle, until the random time generated in the channel sense state 318 has elapsed. At that point the state machine transitions back to the channel sense state 318.

In the power up transmitter state 320, a register in the FPGA is written to tell it that VDL Mode A data is being sent and that the transmitter should be powered up. This is necessary because unlike VHF communication channels, which use zeros to indicate no data, zeros are valid output values for VDL Mode A. The state machine then transitions to an encode/modulate/transmit state 322, which occurs on the next system interrupt.

In the encode/modulate/transmit state 322, data is read from the input buffer and encoded. During each interrupt cycle, only enough data is read to generate four 16-bit samples, which are then "conditioned" for modulation by hardware, and then output. If fewer than four samples can be generated from the remaining input data then the output data is padded with zeros. When all the data for a message has been output, the state machine transitions to the power down transmitter state 324, which occurs on the next system interrupt.

In the power down transmitter state 324, a register in the FPGA is written to tell it that the final value of a message has been sent and the transmitter should be powered down. The state machine then transitions to the idle state 312.

It should be noted that when the VDL Mode A protocol is employed, there is no channel congested indication sent up the link layers (i.e., no TM2 timer as in the VDL Mode 2 protocol).

A computer or processor used in the present system and method can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present method and system.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact disks, DVDs, Blu-ray discs, or other optical storage disks; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

EXAMPLE EMBODIMENTS

Example 1 includes a method of function prioritization in a multi-channel voice-datalink radio, the method comprising: suspending transmission of one or more data messages on a communication channel when transmission of a voice message is active on the communication channel; buffering the one or more data messages while the transmission of the voice message is active; and resuming transmission of the buffered one or more data messages on the communication channel when the transmission of the voice message ends.

Example 2 includes the method of Example 1, wherein the voice message is activated on the communication channel via a push-to-talk function in an aircraft.

Example 3 includes the method of any of Examples 1-2, wherein the transmission of one or more data messages is on a first channel frequency, and the transmission of the voice message is on a second channel frequency different than the first channel frequency.

Example 4 includes the method of any of Examples 1-3, wherein the communication channel operates with a carrier sense multiple access (CSMA) protocol.

Example 5 includes the method of any of Examples 1-4, wherein the communication channel operates using VHF data link (VDL) mode 2 protocol.

Example 6 includes the method of any of Examples 1-4, wherein the communication channel operates using VDL mode A protocol.

Example 7 includes the method of any of Examples 1-6, wherein transmission of the buffered one or more data messages is resumed from the beginning of a last message block not fully transmitted by a VDL transmitter.

Example 8 includes a multi-channel voice-datalink radio system comprising: a multi-mode radio module comprising a transmitter section including at least one transmitter configured to send a radio frequency (RF) signal in a communications band to a first antenna, the RF signal comprising data or voice communications; a receiver section including at least one receiver configured to receive an RF signal in the communications band from the first antenna; and a processor section including at least one digital signal processor operatively coupled to the transmitter section and the receiver section. A digital interface unit is operatively coupled to the processor section. The processor section is configured to suspend transmission of one or more data messages on a communication channel when transmission of a voice message is active on the communication channel; buffer the one or more data messages while the transmission of the voice message is active; and resume transmission of the buffered one or more data messages on the communication channel when the transmission of the voice message ends.

Example 9 includes the radio system of Example 8, wherein the processor section further comprises at least one memory unit and a field programmable gate array, which are operatively coupled to the digital signal processor.

Example 10 includes the radio system of any of Examples 8-9, wherein the transmitter is operatively coupled to the processor section through a digital to analog converter.

Example 11 includes the radio system of any of Examples 8-10, wherein the receiver is operatively coupled to the processor section through an analog to digital converter.

Example 12 includes the radio system of Example 11, wherein the analog to digital converter outputs a digital signal to a data buffer.

Example 13 includes the radio system of Example 12, wherein the data buffer is operatively coupled to the digital signal processor, the memory unit, and the field programmable gate array; and the data buffer is configured to hold the one or more data messages while the transmission of the voice message is active.

Example 14 includes the radio system of any of Examples 8-13, wherein the voice message is activated on the communication channel via a push-to-talk function in an aircraft.

Example 15 includes the radio system of any of Examples 8-14, wherein the transmission of one or more data messages is on a first channel frequency, and the transmission of the voice message is on a second channel frequency different than the first channel frequency.

Example 16 includes the radio system of any of Examples 8-15, wherein the communication channel operates with a CSMA protocol.

Example 17 includes the system of any of Examples 8-16, wherein the communication channel operates using VDL mode 2 protocol.

Example 18 includes the system of any of Examples 8-16, wherein the communication channel operates using VDL mode A protocol.

Example 19 includes a computer program product comprising a non-transitory computer readable medium including instructions executable by a processor to perform a method of function prioritization in a multi-channel voice-datalink radio, the method comprising: suspending transmission of one or more data messages on a communication channel when transmission of a voice message is active on the communication channel; buffering the one or more data messages while the transmission of the voice message is active; and resuming transmission of the buffered one or more data messages on the communication channel when the transmission of the voice message ends.

Example 20 includes the computer program product of Example 19, wherein the communication channel operates using VDL mode 2 protocol, or VDL mode A protocol.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method of function prioritization in a multi-channel voice-datalink radio, the method comprising:
   suspending transmission of one or more data messages on a first communication channel frequency when transmission of a voice message is active on a second communication channel frequency;
   buffering the one or more data messages while the transmission of the voice message is active; and
   resuming transmission of the buffered one or more data messages on the first communication channel frequency when the transmission of the voice message ends;
   wherein during transmission of the voice message, a physical layer of the radio reports to a communication link layer that the first communication channel frequency is busy when the first communication channel frequency is actually not busy.

2. The method of claim 1, wherein the voice message is activated on the second communication channel frequency via a push-to-talk function in an aircraft.

3. The method of claim 1, wherein the first communication channel frequency operates with a carrier sense multiple access (CSMA) protocol.

4. The method of claim 1, wherein the first communication channel frequency operates using very high frequency (VHF) data link mode 2 protocol.

5. The method of claim 1, wherein the first communication channel frequency operates using VHF data link (VDL) mode A protocol.

6. The method of claim 1, wherein transmission of the buffered one or more data messages is resumed from the beginning of a last message block not fully transmitted by a VDL transmitter.

7. A multi-channel voice-datalink radio system, comprising:
   a multi-mode radio module comprising:
   a transmitter section including at least one transmitter configured to send a radio frequency (RF) signal in a communications band to an antenna, the RF signal comprising data or voice communications;

a receiver section including at least one receiver configured to receive an RF signal in the communications band from the antenna; and a processor section including at least one digital signal processor operatively coupled to the transmitter section and the receiver section; and a digital interface unit operatively coupled to the processor section;

wherein the processor section is configured to:
suspend transmission of one or more data messages on a first communication channel frequency when transmission of a voice message is active on a second communication channel frequency;

buffer the one or more data messages while the transmission of the voice message is active; and resume transmission of the buffered one or more data messages on the first communication channel frequency when the transmission of the voice message ends;

wherein during transmission of the voice message, a physical layer of the radio module reports to a communication link layer that the first communication channel frequency is busy when the first communication channel frequency is actually not busy.

8. The radio system of claim 7, wherein the processor section further comprises at least one memory unit and a field programmable gate array, which are operatively coupled to the digital signal processor.

9. The radio system of claim 8, wherein the transmitter is operatively coupled to the processor section through a digital to analog converter.

10. The radio system of claim 9, wherein the receiver is operatively coupled to the processor section through an analog to digital converter.

11. The radio system of claim 10, wherein the analog to digital converter outputs a digital signal to a data buffer.

12. The radio system of claim 11, wherein:
the data buffer is operatively coupled to the digital signal processor, the memory unit, and the field programmable gate array; and
the data buffer is configured to hold the one or more data messages while the transmission of the voice message is active.

13. The radio system of claim 7, wherein the voice message is activated on the second communication channel frequency via a push-to-talk function in an aircraft.

14. The radio system of claim 7, wherein the first communication channel frequency operates with a carrier sense multiple access (CSMA) protocol.

15. The radio system of claim 7, wherein the first communication channel frequency operates using VHF data link (VDL) mode 2 protocol.

16. The radio system of claim 7, wherein the first communication channel frequency operates using VDL mode A protocol.

17. A computer program product, comprising:
a non-transitory computer readable medium including instructions executable by a processor to perform a method of function prioritization in a multi-channel voice-datalink radio, the method comprising:
suspending transmission of one or more data messages on a first communication channel frequency when transmission of a voice message is active on a second communication channel frequency;
buffering the one or more data messages while the transmission of the voice message is active; and
resuming transmission of the buffered one or more data messages on the first communication channel frequency when the transmission of the voice message ends;
wherein during transmission of the voice message, a physical layer of the radio reports to a communication link layer that the first communication channel frequency is busy when the first communication channel frequency is actually not busy.

18. The computer program product of claim 17, wherein the first communication channel frequency operates using VHF data link (VDL) mode 2 protocol, or VDL mode A protocol.

* * * * *